(12) United States Patent
Chanbasha et al.

(10) Patent No.: US 9,278,873 B1
(45) Date of Patent: Mar. 8, 2016

(54) METHOD TO REMOVE ORGANIC POLLUTANTS BY ELECTROCATALYSIS

(71) Applicant: King Fahd University of Petroleum and Minerals, Dhahran (SA)

(72) Inventors: Basheer Chanbasha, Karimangalam (IN); Abdulelah Ahmed Thabet, Sana'a (YE)

(73) Assignee: King Fahd University of Petroleum and Minerals, Dhahran (SA)

( * ) Notice: Subject to any disclaimer, the term of this patent is extended or adjusted under 35 U.S.C. 154(b) by 105 days.

(21) Appl. No.: 14/458,834

(22) Filed: Aug. 13, 2014

(51) Int. Cl.
*C02F 1/461* (2006.01)

(52) U.S. Cl.
CPC ....... *C02F 1/461* (2013.01); *C02F 2201/46115* (2013.01)

(58) Field of Classification Search
CPC ........... C02F 1/461; C02F 2201/46115; C02F 2001/46142
USPC ......................................................... 205/742
See application file for complete search history.

(56) References Cited

U.S. PATENT DOCUMENTS

| 2012/0090988 | A1 | 4/2012 | Li et al. | |
| 2013/0032491 | A1* | 2/2013 | Nitta | C02F 1/46109 205/758 |

FOREIGN PATENT DOCUMENTS

CN 101104537 A 1/2008

OTHER PUBLICATIONS

J. Grimm, et al., "Sol-gel-film-preparation of novel electrodes for the electrocatalytic oxidation of organic pollutants in water", "Desalination", vol. 115, Issue 3, Aug. 1998, 1 page.

Jongmo Im, et al., "Effect of atomization methods on the size and morphology of $Gd_{0.1}Ce_{0.9}O_{2-\delta}$ powder synthesized by aerosol flame synthesis", "Ceramics International", vol. 38, Issue 3, Apr. 2012, 1 pages.

Yang Y, et al., "Novel functionalized nano-TiO2 loading electrocatalytic membrane for oily wastewater treatment", Environ Sci Technol., Jun. 2012, 1 page.

* cited by examiner

*Primary Examiner* — Arun S Phasge
(74) *Attorney, Agent, or Firm* — Oblon, McClelland, Maier & Neustadt, L.L.P.

(57) ABSTRACT

A method for removing chlorinated organic pollutants from an aqueous composition by electrocatalysis, including electrolyzing the aqueous composition, in a capillary reactor, with an applied potential of 1-5 kV, in which, during the electrolyzing, the aqueous composition is in contact with porous silica supported-sol-gel coated platinum and titanium catalysts and the electrolyzing forms hydrogen and hydrogen chloride.

12 Claims, 8 Drawing Sheets

METHOD TO REMOVE ORGANIC
POLLUTANTS BY ELECTROCATALYSIS

BACKGROUND OF THE INVENTION

1. Field of the Disclosure

The present invention relates to a method for removal of organic pollutants (OPs) by electrocatalysis.

2. Description of Related Art

In recent years, anti-pollution electrocatalysis and electrical-catalyzed membrane-separation for water treatment has been developed. Techniques to solve fundamental problems such as energy, resource and environment problems have been investigated.

U.S. 2012/0090988 A1 is related to anti-pollution electrocatalysis composite membrane and membrane reactor. The electrocatalytic composite membrane consists of a substrate and catalytic coating and the membrane reactor provides a trans-membrane pressure as the membrane separation power generated by a pump. The electrocatalytic composite membrane as anode and an auxiliary electrode as cathode are connected to a direct current regulated power supply separately by conducting wires so that an electrolysis apparatus is formed to degrade the pollutant attached on the surface and in the pores of the membrane by electrocatalytic oxidation. The direct current regulated power supply provides 0-30 V of supply voltage and 0-10 A of current.

CN101104537A relates to electrocatalysis using a separation film for a water treatment device. The separation membrane divides internal space of shell into dope space and filtration space. The dope space has raw water inlet and dope outlet and a net-like conductor. The separation membrane and net-like conductor are separately connected with constant current power supply to form electron emission area and electron receiving area. The current adjusting scope of the constant current power supply is between 0 and 50 A, the input pressure voltage is 220 V, and the output voltage is 24 or 12 V. This approach only requires low voltages.

Development of a more effective means of cleaning water by removing organic pollutants by electrocatalysis is essential. Therefore, the present invention applies porous silica supported sol-gel coated platinum and titanium catalysts in which the porous support silica are synthesized from a rice husk material. Due to employment of a glass capillary microreactor, catalytic activity is enhanced by electrokinetic mobility of the target analytes which does not require physical pumps and shortens the time required for removal. The use of rice husk as support for platinum (RHA-Pt) and titanium (RHA-Ti) catalysts for removal of organic pollutants in a glass capillary microreactor has not been previously reported.

BRIEF SUMMARY

An object of the invention is a method for removing chlorinated organic pollutants from an aqueous composition by electrocatalysis.

In an embodiment the method includes electrolyzing the aqueous composition in a capillary reactor, with an applied potential of 1-5 kV.

In another embodiment the aqueous composition is in contact with porous silica supported-sol-gel coated platinum and titanium catalysts.

In another embodiment the electrolyzing forms hydrogen and hydrogen chloride.

In one embodiment of the invention, the electrolyzing is carried out at a constant current of 200 µA.

In another embodiment, the aqueous composition passes through the capillary reactor during the electrolyzing without mechanical pumping.

DETAILED DESCRIPTION

Figure 1A:
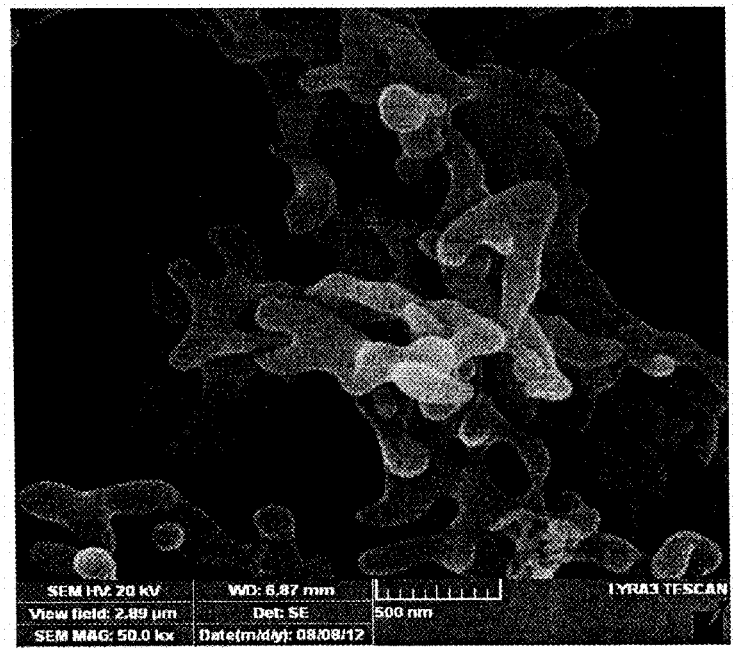
FIG. 1A is a scanning electron micrograph showing the percentage of the component in the sample of RHA-silica.
Figure 1B:
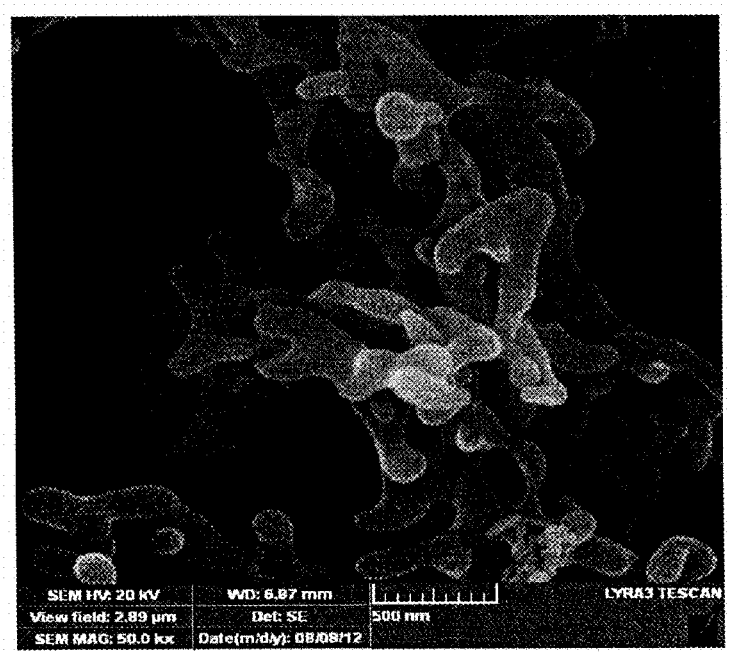
FIG. 1B is a scanning electron micrograph showing the percentage of the component in the sample of RHA-Pt.
Figure 1C:
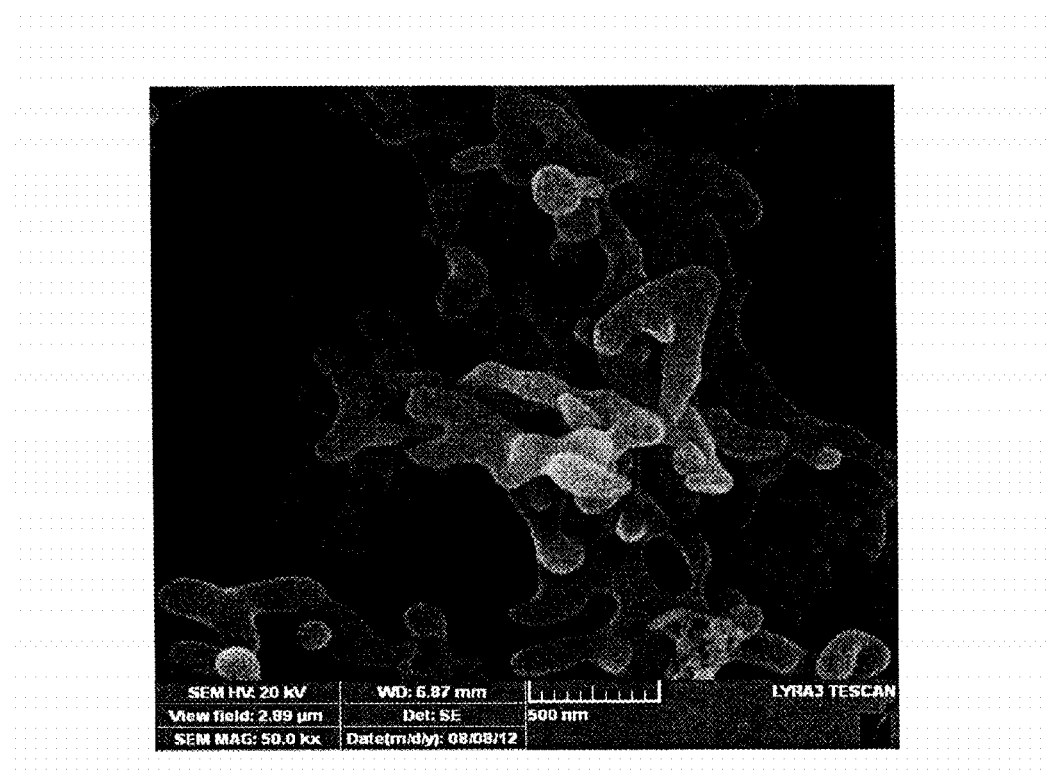
FIG. 1C is a scanning electron micrograph showing the percentage of the component in the sample of RHA-Ti.
Figure 1D:
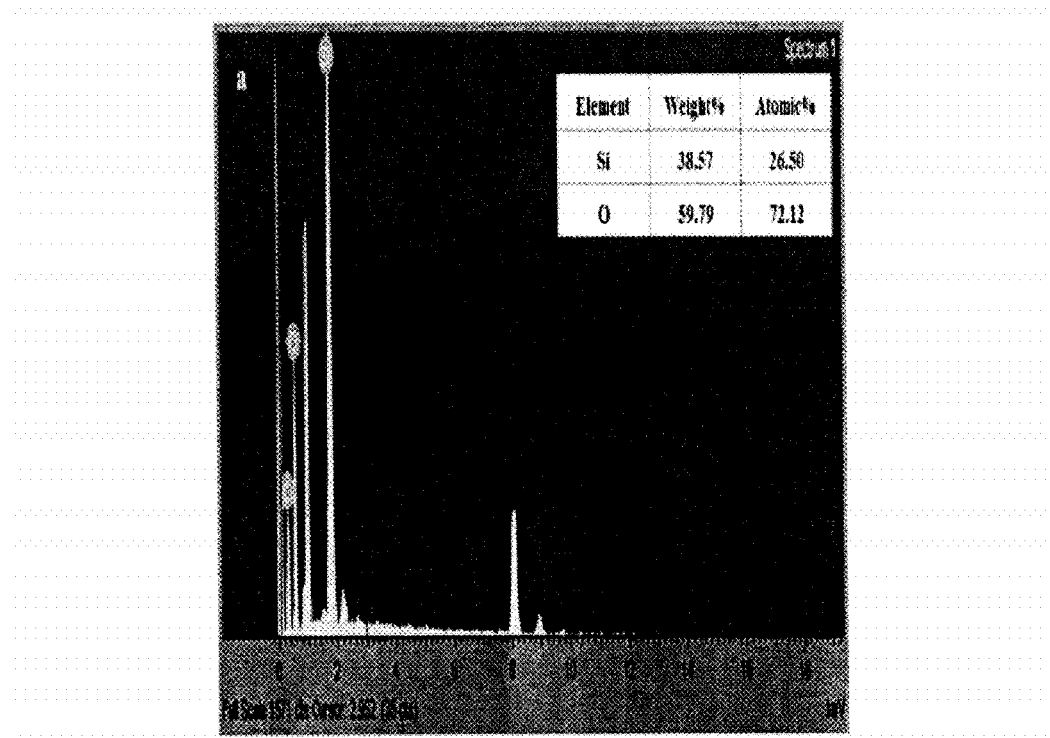
FIG. 1D is an EDX spectrum and inset showing the percentage of the component in the sample of RHA-silica.
Figure 1E:
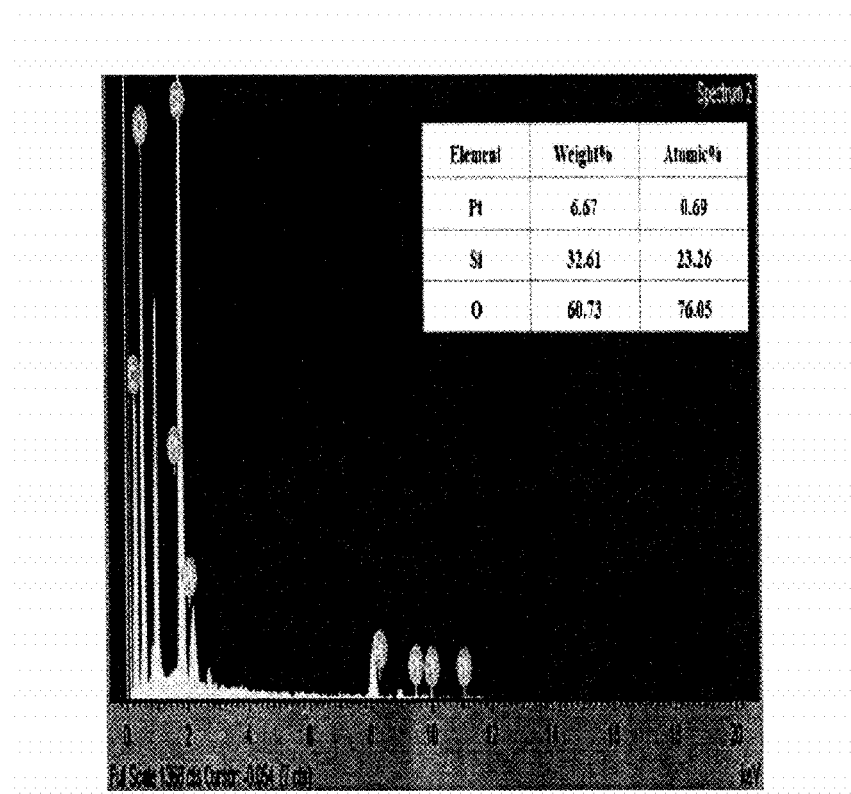
FIG. 1E is an EDX spectrum and inset showing the percentage of the component in the sample of RHA-Pt.
Figure 1F:
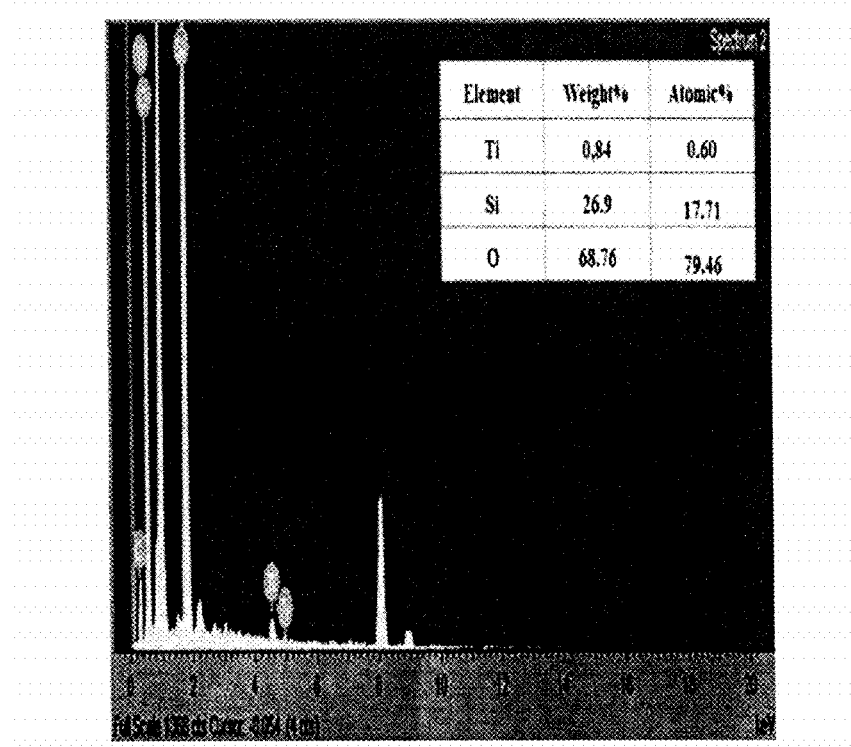
FIG. 1F is an EDX spectrum and inset showing the percentage of the component in the sample of RHA-Ti.

The present invention includes a method for removing organic pollutants (OPs) by electrocatalysis from an aqueous composition. The method comprises electrolyzing the aqueous composition, in a capillary reactor, wherein during the electrolyzing, the aqueous composition is in contact with porous silica supported sol-gel coated platinum and titanium catalysts. In this method, the electrolyzing forms hydrogen and hydrogen chloride.

The porous silica supported sol-gel coated platinum and titanium catalysts are prepared from rice husk-ash by a sol-gel method. Rice husks as used herein are the hard protecting coverings of grains of rice. Combustion of rice hulls yields rice husk ash as used herein. Rice husk ash is a potential source of amorphous reactive silica.

In the preparation, clean rice husk (RH) is mixed with $HNO_3$ (1.0 M) at room temperature. The cleaned RH is washed with distilled water to a constant pH and then dried in an oven at a temperature of 120° C. and burned in a muffle furnace at a temperature of from 550 to 650° C. for a time period of 6-7 hours, to obtain white rice husk-ash (RHA).

The RHA is then added to NaOH (1.0 M) and stirred at room temperature for at least 24 hours to obtain sodium silicate solution. CTAB (cetyltrimethyl ammonium bromide) is then added into the sodium silicate solution and stirred until completely dissolved. A molar ratio of CTAB to Si is about 1:1.2. The solution is titrated with $HNO_3$ (0.1 M) with constant stirring until reaching a pH of from 2.5 to 3.5. The resulting gel is then aged for at least five days, then filtered and washed thoroughly with distilled water, and washed with acetone to obtain RHA-silica powder. The gel is dried at a temperature of 110° C., for 24 hours, ground to fine powder, and calcined at a temperature of 500° C. in a muffle furnace for at least five hours.

For the preparation of RHA-Pt catalyst, from 1 to 3% Pt of $PtCl_2$ (weight/volume ratio of RHA to $PtCl_2$) was dissolved in $HNO_3$, and then titrated and the RHA-Pt catalysts were dried in an oven.

A BET surface area of the RHA-silica was measured and is about 225 $m^2/g$. A pore volume ($cm^3/g$) of the RHA-silica catalyst is from 0.15 to 0.35. An average pore size of the RHA-silica is from 4.75 to 5.0 nm.

A BET surface area of the RHA-Pt catalyst is from 535 to 540 $m^2/g$ with a pore volume ($cm^3/g$) of from 0.60 to 0.70 and an average pore size of from 4.70 to 4.75 nm A BET surface area of the RHA-Ti catalyst is from 12 to 14 $m^2/g$ with a pore volume ($cm^3/g$) of from 0.01 to 0.013 and a pore size of 4.10 nm The catalysts are employed for removal of OPs in a glass capillary reactor. The capillary and reservoirs A(+) and B(−) are filled with a buffer solution and the catalyst, and a mixture standard is introduced into the capillary reactants at the reservoir A. Platinum wires are used as the electrodes and high voltage is applied. The electrocatalysis is conducted in an aqueous medium with an applied potential of from 1 to 5 kV, preferably about 3 kV. The applied potential produces $OH^-$ and $H^+$ ions and electrons which activate the catalysis process to degrade OPs. A current of from 150 to 250 μA, preferably about 200 μA, is also applied to the reservoir A, while reservoir B is connected to ground. The reaction time applied is controlled in a range from 10 to 30 min.

The main advantage of using the proposed method is shorter reaction time and complete degradation of 76 organic compounds. In this disclosure, chlorophenol is utilized as a model compound for method optimization. Various experimental conditions influencing removal were optimized. Reaction performance using electrocatalysis was compared with conventional catalysis. The instant process is simple, easy to use and suitable for the removal of wide range of OPs.

EXAMPLE

Catalysts were prepared from RHA by sol-gel method[1]; 30 g of clean rice husk (RH) was stirred with 750 mL of 1.0 M $HNO_3$ at room temperature for 24 hrs. The cleaned RH was washed with copious amount of distilled water to constant pH, then dried in an oven at 100° C. for 24 hr and burned in a muffle furnace at 600° C. for 6 hr so as to obtain white rice husk-ash (RHA). About 3.0 g of RHA was added to 350 mL of 1.0 mol $L^{-1}$ NaOH in a plastic container and stirred for 24 hrs at room temperature to get sodium silicate solution. About 3.6 g of CTAB (1:1.2, Si: CTAB molar ratio) was added into the sodium silicate solution and stirred to dissolve completely. This solution was titrated with 3.0 mol $L^{-1}$ $HNO_3$ at a rate of ca. 1.0 mL $min^{-1}$ with constant stirring until pH 3.0. The resulting gel was aged for 5 days, then filtered and washed thoroughly with distilled water, finally washed with acetone. The gel was dried at 110° C. for 24 hr ground to fine powder and was calcined at 500° C. in a muffle furnace for 5 hrs, then labeled as RHA-silica powder. Same procedure followed for the preparation of RHA-silica Solution of 1.0 wt. % Pt of ($PtCl_2$) which dissolved in 50 mL of 3 mol $L^{-1}$ $HNO_3$ and titrated. Similarly, solution of 1.0 wt. % Ti of ($TiO_2$) dissolved in 50 mL of 3 mol $L^{-1}$ $HNO_3$ was titrated. The resulting gels were treated as described above. The resulting powders were labeled as RHA-Pt and RHA-Ti, respectively.

The prepared catalysts were characterized using Fourier transform infrared (FTIR) spectroscopy, $N_2$ adsorption-desorption analysis, Field-Emission Scanning Electron Microscope (FESEM), and Energy dispersive spectrometry (EDX).

TABLE 1

Nitrogen adsorption-desorption analysis parameters of materials

| Catalyst | BET Surface Area ($m^2/g$) | Pore Volume ($cm^3/g$) | Average Pore Size (nm) |
| --- | --- | --- | --- |
| RHA-silica | 225.4306 | 0.273179 | 4.84725 |
| RHA-Pt | 538.0725 | 0.637532 | 4.73938 |
| RHA-Ti | 12.6548 | 0.012738 | 4.02638 |

Figure 2A:
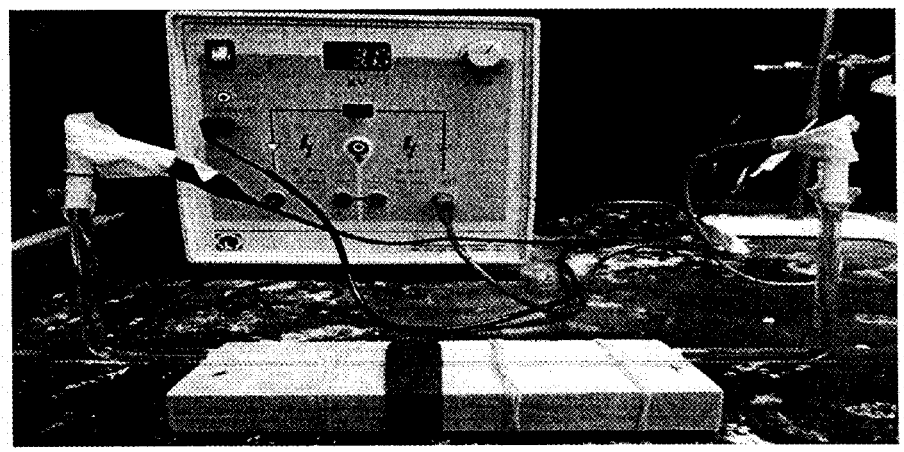
FIG. 2A shows a glass capillary microreactor for removal of MegaMix® Standard OPs using the electrocatalysis method.
Figure 2B:
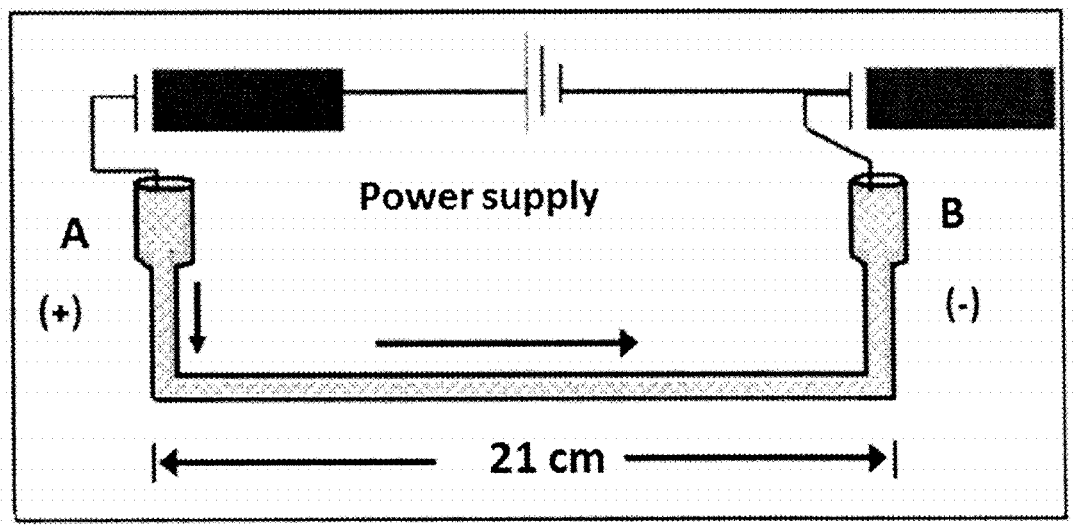
FIG. 2B is a schematic of the glass capillary microreactor for removal of MegaMix® Standard OPs using the electrocatalysis method.

The catalysts were used for removal MegaMix® Standard OPs in in a capillary-micro-reactor. Several glass capillary microreactors (7 cm, 14 cm and 21 cm) were designed for the electrocatalysis method (as shown in FIGS. 2A and 2B). The capillary and reservoirs A(+) and B(−) were filled with 2.5 mmol of buffer solution of different pH (2, 7, and 10) and 12.5 mg catalyst and 100 μL of the mixture standard (8270 MegaMix®) were introduced into the capillary reactants at the reservoir A. Platinum wires were used as the electrodes and high voltage (1-5 kV) were applied. No air bubbles were found inside the capillary tube during the reaction. A reaction potential of (1-5 KV) and 200 μA current were applied to reservoir A, while reservoir B was connected to ground.

To optimize the electrocatalysis method for removal of OPs, analytical factors such as reaction time, applied potential, length of the capillary and pH of buffer solution were investigated to determine the most favorable reaction conditions. Temperature was kept constant at room temperature throughout the reactions. The identification and quantitative yields were determined which were obtained from (GC-MS) data.

Effect of Reaction Time

Figure 3A:
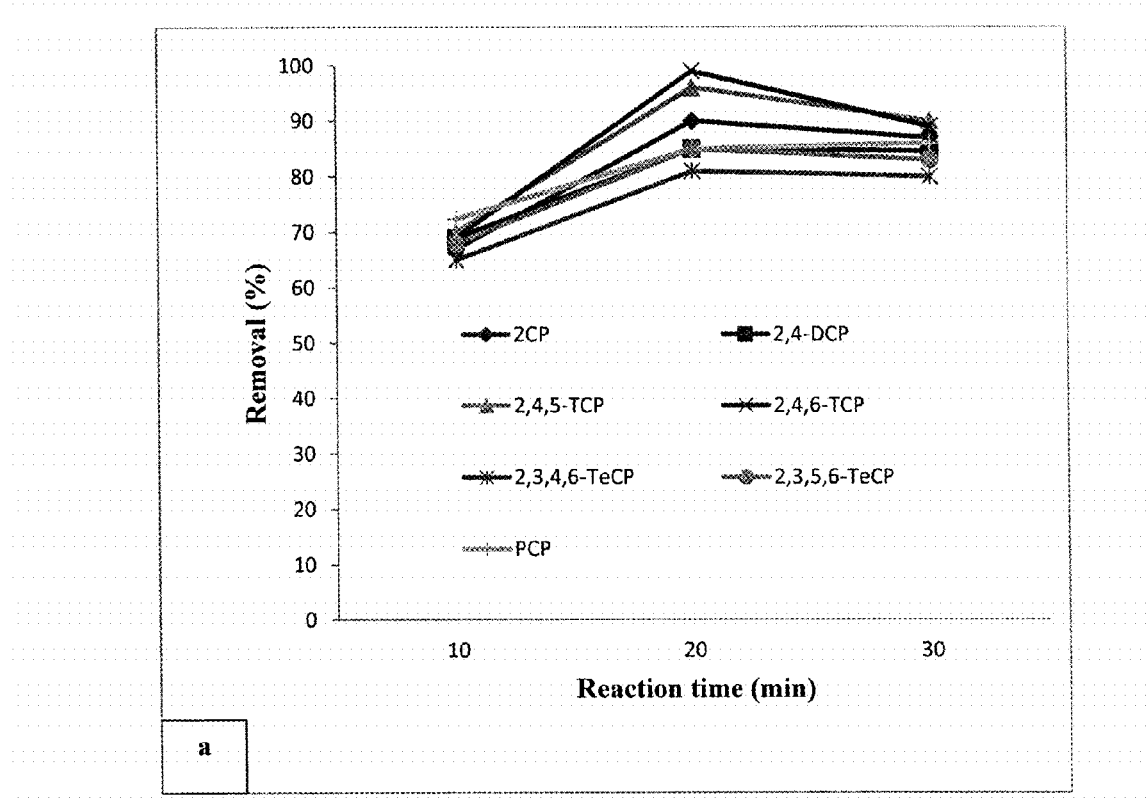
FIG. 3A is a graph showing an effect of different reaction times on the removal ratio of chlorophenols (CP)s in the capillary microreactor of 21 cm length, applied potential 3 kV, using pH 7 and RHA-Pt catalyst.
Figure 3B:
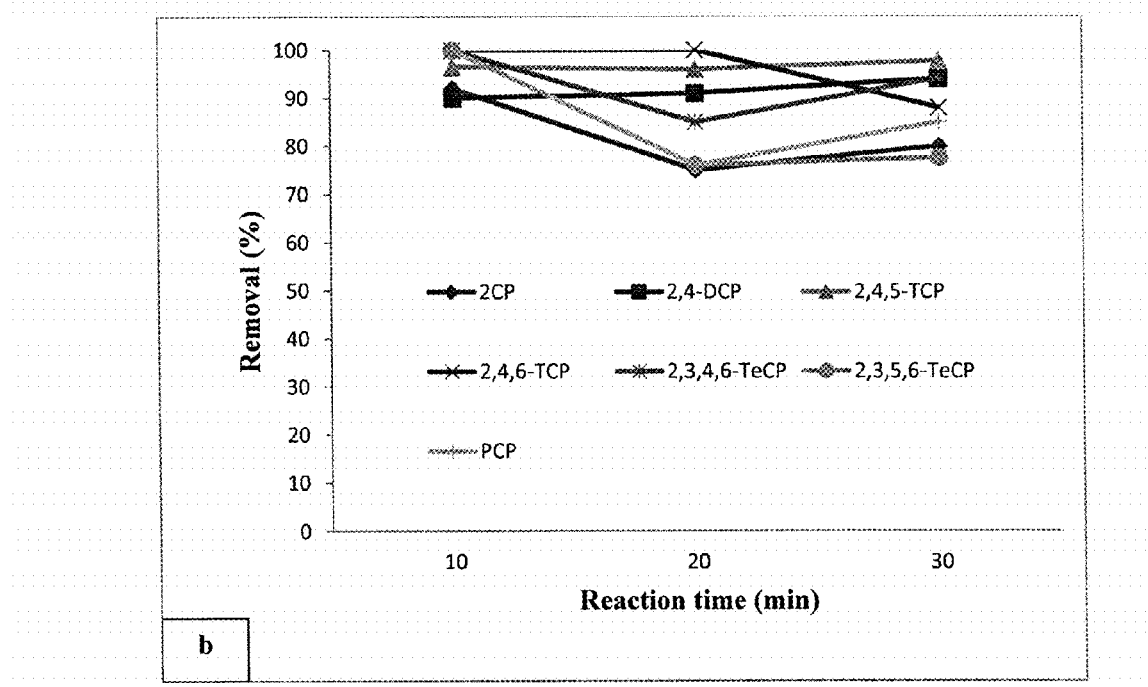
FIG. 3B is a graph showing an effect of different reaction times on the removal ratio of chlorophenols (CP)s in the capillary microreactor of 21 cm length, applied potential 3 kV, using pH 10 and RHA-Ti catalyst.

Reaction time is an important factor in the reactions. Various reaction times (10 min, 20 min and 30 min) were applied. The reaction time was controlled manually. FIG. 3) shows the removal (%) of CPs with respect to these reaction times. The removal increases with increase in reaction time, up to 20 min, by using RHA-Pt catalyst as seen in FIG. 3A, while the best time for the removal of CPs by using RHA-Ti as catalyst was 10 min as shown in FIG. 3B.

Applied Potential

Figure 4A:
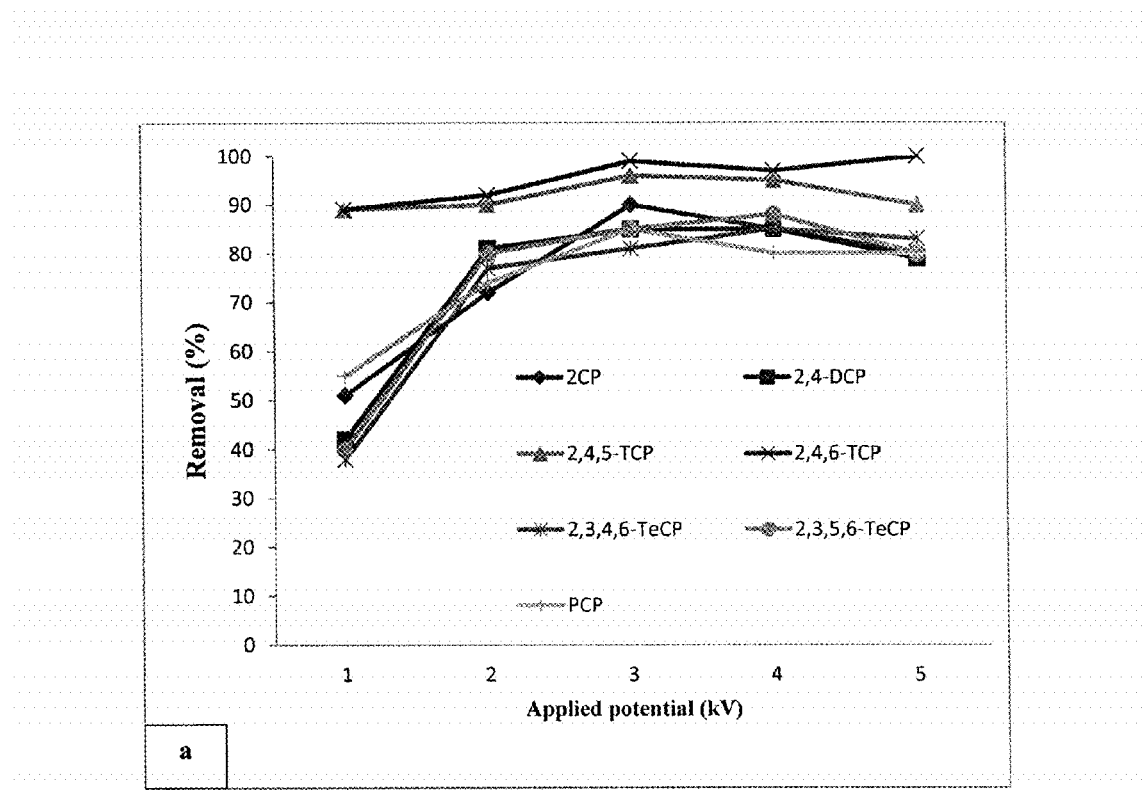
FIG. 4A is a graph showing effect of different applied potentials on the removal ratio at reaction time 20 min and pH 10 by using RHA-Pt in the electrocatalysis method.
Figure 4B:
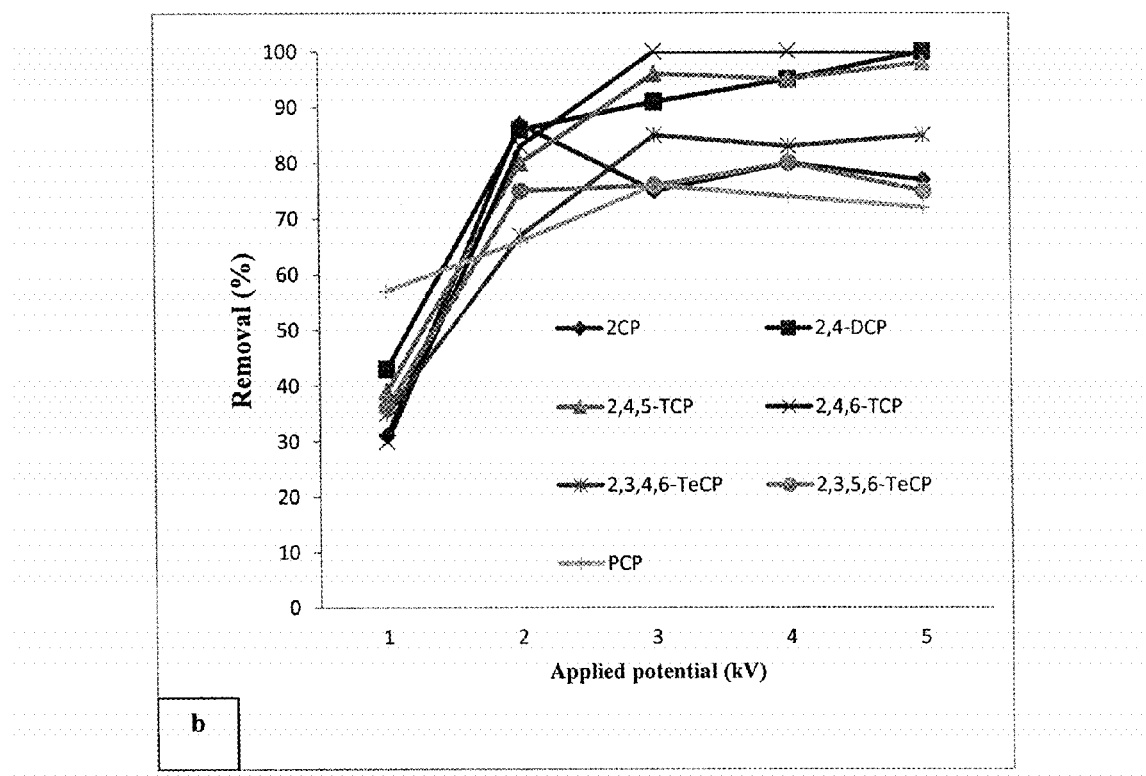
FIG. 4B is a graph showing effect of different applied potentials on the removal ratio at reaction time 20 min and pH 10 by using RHA-Ti in the electrocatalysis method.

In order to achieve a high removal ratio of OPs from 8270 MegaMix® Standard different potential applied in the range of 1-5 kV at a constant current of 200 μA FIG. 4) shows the influence of the applied potential on the HDC reactions. As can be seen, a maximum degradation of CPs by both catalysts (RHA-Pt and RHA-Ti) was obtained by using 3 kV. In electrocatalysis method high potential (in Kv range) was applied to create in-situ generation of hydrogen as well as to expedite the activation of catalysts for the removal of OPs. Moreover, the higher applied potential increases the analyte interaction with the catalyst particles and enhances the reaction to the remove OPs in the 8270 MegaMix® Standard.

Length of the Capillary-Microreactor

For micro devices using an electrophoretic separation at constant field, resolution is proportional to the square of the channel length. Various lengths (7 cm, 14 cm, 21 cm) of the capillary were studied and significant improvement was obtained in the removal of OPs when the length of the capillary was increased from 7 cm to 21 cm as shown in Table 2.

TABLE 2

Effect of Length of the capillary microreactor on the Removal ratio of CPs by using electrocatalysis method

| Compound name | % of degradation Length of the capillary-microreactor | | |
|---|---|---|---|
| | 7 cm | 14 cm | 21 cm |
| 2CP | 72 | 81 | 90 |
| 2,4-DCP | 81 | 83 | 85 |
| 2,4,5-TCP | 81 | 88 | 96 |
| 2,4,6-TCP | 95 | 98 | 99 |
| 2,3,4,6-TeCP | 59 | 70 | 81 |
| 2,3,5,6-TeCP | 65 | 78 | 90 |
| PCP | 52 | 69 | 85 |

Reaction pH

Figure 5A:
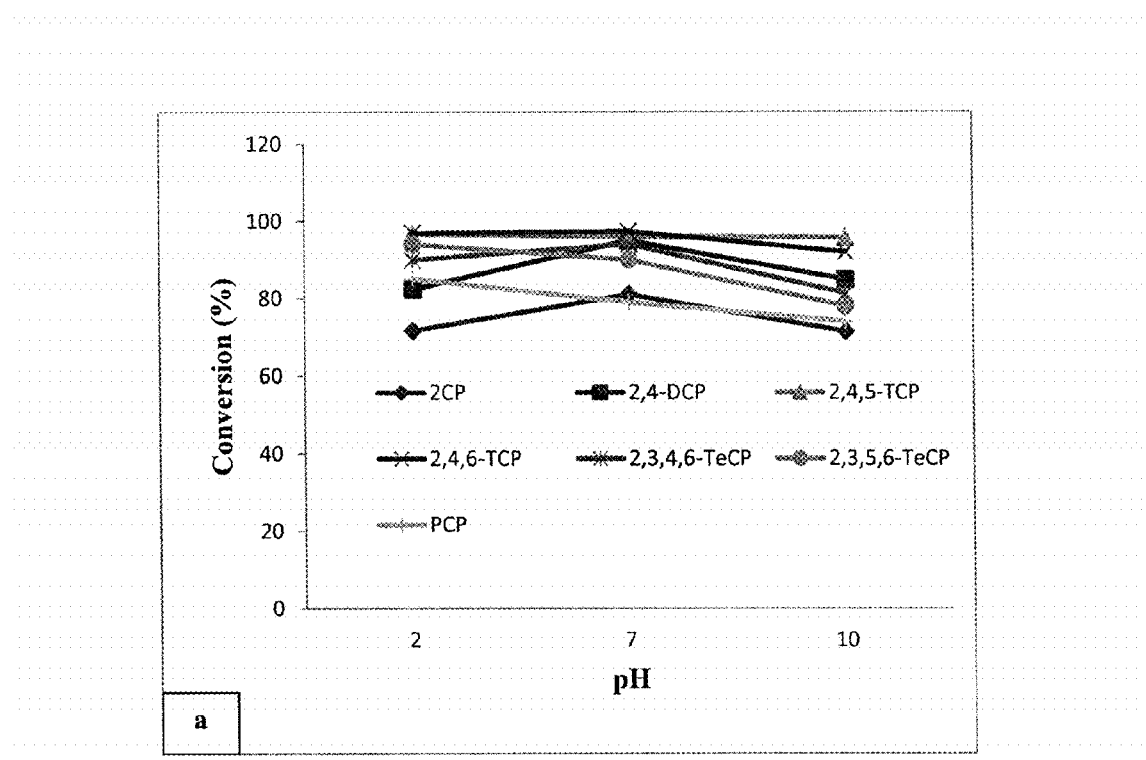
FIG. 5A is a graph showing effect of reaction pH on the removal ratio of (CPs) by using electrocatalysis method in the capillary-microreactor (at 20 min and applied potential (3 kV) by using RHA-Pt.
Figure 5B:
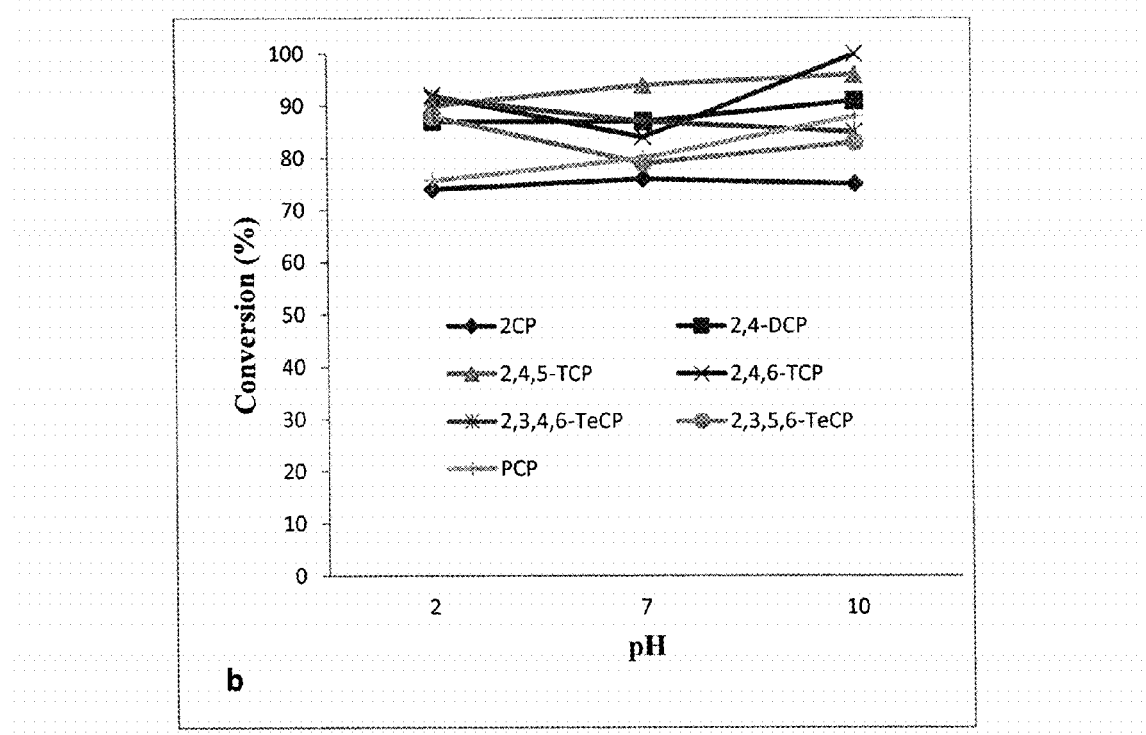
FIG. 5B is a graph showing effect of reaction pH on the removal ratio of (CPs) by using electrocatalysis method in the capillary-microreactor (at 20 min and applied potential (3 kV) by using RHA-Pt.

The pH of the solution is an important parameter which controls the rate of the reaction. The pH of the solution studied was (2.0, 7.0 and 10). FIG. 5 shows the removal of the OPs involving different catalysts. The maximum removal by using RHA-Pt catalyst was observed in neutral range (pH 7) compared to other buffer solutions, which may be due to the dissolving of platinum particles, whereas when RHA-Ti was used as catalyst, the maximum removal was obtained in alkaline range (pH 10).

Quantitative determination of removal of OPs using electrocatalysis method with (GC-MS)

Figure 6:
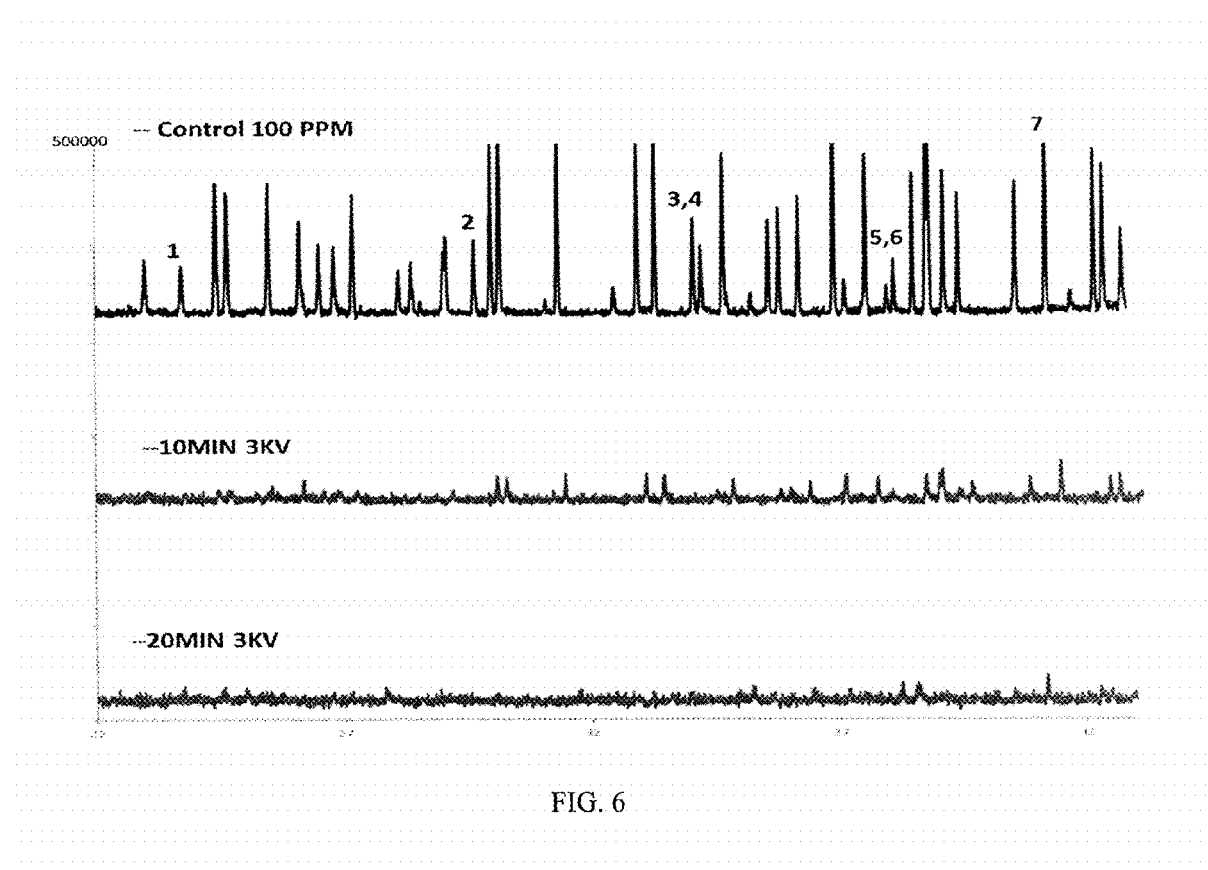
FIG. 6 is a GC-MS chromatogram of OPs as CPs before and after the removal of OPs using the electrocatalysis method in a glass capillary-microreactor method.

In order to evaluate the most favorable reaction conditions, i.e. the optimum removal conditions for reaction of OPs, a reaction time of 20 min, pH 7 and applied potential of 3 kV was used with 21 cm long capillary-microreactor when using RHA-Pt as the catalyst, and a reaction time of 10 min, pH 10 and applied potential of 3 kV was used with 21 cm long capillary-microreactor when using as RHA-Ti as the catalyst. The electrocatalysis method using capillary-microreactor provided high removal ratio of CPs in a short time (10 min and 20 min) using little amount of the reactant. FIG. 6 shows GC-MS chromatogram of OPs as CPs before and after the removal of OPs using electrocatalysis method in a glass capillary-microreactor method. In FIG. 6, a GC-MS chromatogram of CPs using a conventional method, the control 100 ppm before a reaction occurs (Top), after 10 Min (middle) and after 20 Min (bottom) is shown, in which the peaks are: 1 (2-chloroPhenol), 2 (2,4-dichloroPhenol), 3 (2,4,6-trichlorophenol), 4 (2,4,5-trichlorophenol), 5 (2,3,4,6-trichlorophenol), 6 (2,3,5,6-trichlorophenol), 7 (pentachlorophenol).

In summary, optimization of the removal ratio of OPs to achieve better reaction performance by an electrocatalysis method using a glass capillary-microreactor with high removal ratio in comparison with conventional method and the most favorable reaction conditions are demonstrated. The RHA-Ti and RHA-Pt catalysts show catalytic activity in the removal of OPs under mild condition at room temperature and ambient pressure by using buffered solution in the presence of supported catalysts of RHA-Ti and RHA-Pt. A reaction time of 20 min is sufficient to completely remove OPs by the electrocatalysis method in the capillary micro reactor. The method of this invention is suitable for the degradation of wide range of chlorinated organic pollutants. Rice husk supported platinum (RHA-Pt) and titanium (RHA-Ti) catalysts and a high potential (in the Kv range) were applied to enhance the catalytic activity via electrokinetic mobility of the target analytes, in which no physical pumps were required, leading to a shorter reaction time required for removal. The electrocatalysis is environmentally benign and is suitable for application in water decontamination or waste disposal pre-treatment.

The invention claimed is:

1. A method for removing chlorinated organic pollutants from an aqueous composition by electrocatalysis, comprising:
    electrolyzing the aqueous composition, in a capillary reactor, with an applied potential of 1-5 kV,
    wherein during the electrolyzing, the aqueous composition is in contact with at least one of a porous silica supported-sol-gel coated platinum catalyst or a porous silica supported-sol-gel coated titanium catalyst; and
    wherein the electrolyzing forms hydrogen and hydrogen chloride.

2. The method of claim 1, wherein the electrolyzing is carried out at a constant current of from 150 to 250 µA.

3. The method of claim 1, wherein the aqueous composition passes through the capillary reactor during the electrolyzing without mechanical pumping.

4. The method of claim 1, wherein the capillary reactor is a glass capillary microreactor.

5. The method of claim 1, wherein during the electrolyzing, the aqueous composition is in contact with porous silica supported-sol-gel coated platinum catalysts.

6. The method of claim 5, wherein a reaction time in the electrolyzing is about 20 min.

7. The method of claim 5, wherein a pH of the aqueous composition is about 7.

8. The method of claim 5, wherein a pH of the aqueous composition is about 10.

9. The method of claim 1, wherein during the electrolyzing, the aqueous composition is in contact with porous silica supported-sol-gel coated titanium catalysts.

10. The method of claim 9, wherein a reaction time in the electrolyzing is about 10 min.

11. The method of claim 1, wherein a length of the capillary is from 7 to 21 cm.

12. The method of claim 1, wherein the applied potential is about 3 kV.

* * * * *